US010055008B2

(12) United States Patent
Honda

(10) Patent No.: US 10,055,008 B2
(45) Date of Patent: Aug. 21, 2018

(54) PORTABLE ELECTRONIC DEVICE, METHOD OF CONTROLLING PORTABLE ELECTRONIC DEVICE, AND NON-TRANSITORY COMPUTER READABLE RECORDING MEDIUM

(71) Applicant: KYOCERA CORPORATION, Kyoto (JP)

(72) Inventor: Natsuhito Honda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 129 days.

(21) Appl. No.: 15/273,446

(22) Filed: Sep. 22, 2016

(65) Prior Publication Data

US 2017/0090552 A1 Mar. 30, 2017

(30) Foreign Application Priority Data

Sep. 28, 2015 (JP) ................................ 2015-189253

(51) Int. Cl.
*G06F 1/26* (2006.01)
*G06F 1/32* (2006.01)
*H02J 9/00* (2006.01)
*G01C 5/06* (2006.01)
*G06F 1/16* (2006.01)

(52) U.S. Cl.
CPC ............. *G06F 1/3296* (2013.01); *G01C 5/06* (2013.01); *G06F 1/1684* (2013.01); *G06F 1/3212* (2013.01); *H02J 9/002* (2013.01); *H02J 9/005* (2013.01); *G06F 1/3203* (2013.01); *Y02D 10/174* (2018.01)

(58) Field of Classification Search
CPC .... G06F 1/3296; G06F 1/1684; G06F 1/3212; G01C 5/06; H02J 9/002; H02J 9/005; Y02D 10/174
USPC .......................................................... 713/310
See application file for complete search history.

(56) References Cited

U.S. PATENT DOCUMENTS

| 8,655,307 | B1* | 2/2014 | Walker .............. H04W 52/0212 455/405 |
| 2003/0049135 | A1* | 3/2003 | Gray ................. A61M 5/14216 417/44.1 |
| 2010/0003950 | A1* | 1/2010 | Ray ....................... G10L 13/043 455/404.1 |
| 2010/0009643 | A1* | 1/2010 | Haartsen ........... H04W 52/0251 455/127.5 |
| 2010/0048253 | A1* | 2/2010 | Park ...................... G06F 1/1613 455/566 |

(Continued)

FOREIGN PATENT DOCUMENTS

JP 4267174 2/2009

*Primary Examiner* — Jaweed A Abbaszadeh
*Assistant Examiner* — Volvick Derose
(74) *Attorney, Agent, or Firm* — Duane Morris LLP

(57) ABSTRACT

A portable electronic device includes a battery, a communication unit, a pressure detector, and at least one processor. The battery supplies power. The communication unit communicates with an external device. The pressure detector detects pressure. The at least one processor increases a shutoff reference value in accordance with a drop in the pressure. The at least one processor shuts off the supply of the power when the remaining battery capacity of the battery is less than the shutoff reference value.

14 Claims, 10 Drawing Sheets

(56) References Cited

U.S. PATENT DOCUMENTS

| | | | |
|---|---|---|---|
| 2011/0039606 A1* | 2/2011 | Kim | H04M 1/72522 455/574 |
| 2012/0122526 A1* | 5/2012 | Bockus | H04W 52/0258 455/572 |
| 2013/0179719 A1* | 7/2013 | Tseng | G06F 1/263 713/340 |
| 2013/0285958 A1* | 10/2013 | Nishimura | G06F 3/0416 345/173 |
| 2014/0075220 A1* | 3/2014 | Song | H04W 52/0277 713/320 |
| 2014/0266705 A1* | 9/2014 | McKinley | G08B 25/10 340/539.13 |
| 2015/0002160 A1* | 1/2015 | Lee | G06F 1/26 324/427 |
| 2016/0209907 A1* | 7/2016 | Han | G06F 3/3209 |
| 2017/0161478 A1* | 6/2017 | Stavrou | G06F 21/316 |
| 2017/0223180 A1* | 8/2017 | Wang | H04M 1/72583 |
| 2017/0280393 A1* | 9/2017 | Suo | H04W 52/027 |

\* cited by examiner

F I G. 1 9
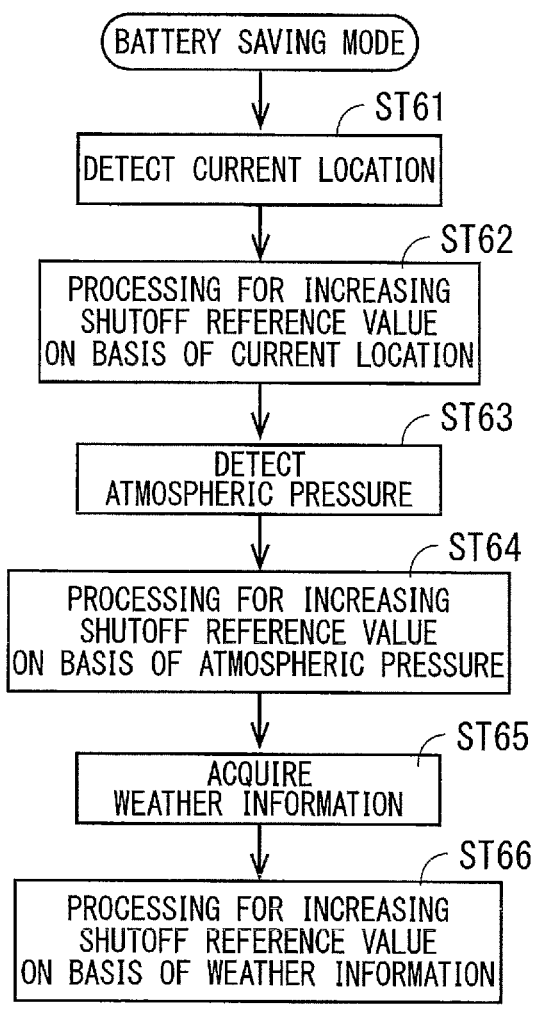

PORTABLE ELECTRONIC DEVICE, METHOD OF CONTROLLING PORTABLE ELECTRONIC DEVICE, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2015-189253, filed on Sep. 28, 2015, entitled "PORTABLE ELECTRONIC DEVICE," the content of which is incorporated by reference herein in its entirety.

FIELD

Embodiments of the present disclosure relate generally to portable electronic devices, methods of controlling a portable electronic device, and non-transitory computer readable recording media.

BACKGROUND

A mobile phone which performs shutdown operation has been proposed. This mobile phone executes a shutdown sequence under the following condition. That is, the shutdown sequence is executed when a predetermined extension time has elapsed after the remaining capacity of the battery (hereinafter, also referred to as "remaining battery capacity") has fallen below a predetermined value. As a result of executing this shutdown sequence, the mobile phone is powered off.

SUMMARY

A portable electronic device, a method of controlling a portable electronic device, and a non-transitory computer readable recording medium are disclosed. In one embodiment, a portable electronic device includes a battery, a communication unit, a pressure detector, and at least one processor. The battery is configured to supply power. The communication unit is configured to communicate with an external device. The pressure detector is configured to detect pressure. The at least one processor is configured to increase a shutoff reference value in accordance with a drop in the pressure. The at least one processor is also configured to shut off the supply of the power when a remaining battery capacity of the battery is less than the shutoff reference value.

In one embodiment, a method of controlling a portable electronic device includes first to third steps. The first step is to detect pressure. The second step is to increase a shutoff reference value in accordance with a drop in pressure. The third step is to shut off power supply from a battery of the portable electronic device when the remaining capacity of the battery is less than the shutoff reference value.

In one embodiment, a non-transitory computer readable recording medium stores a control program that causes a portable electronic device to execute first to third steps. The first step is to detect pressure. The second step is to increase a shutoff reference value in accordance with a drop in pressure. The third step is to shut off power supply from a battery of the portable electronic device when the remaining capacity of the battery is less than the shutoff reference value.

BRIEF DESCRIPTION OF THE DRAWINGS

FIG. 19 illustrates a flowchart showing an example of the operation of increasing the shutoff reference value.

DETAILED DESCRIPTION

First Embodiment

Portable Electronic Device

External View

Figure 1:
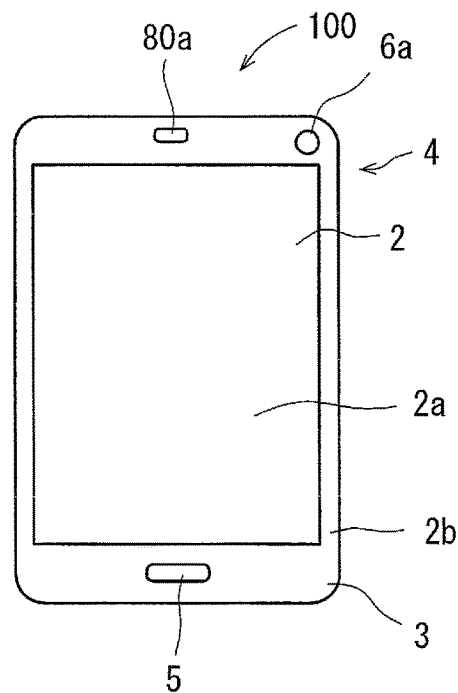
FIG. 1 illustrates a front view of an exemplary overview of an electronic device.
Figure 2:
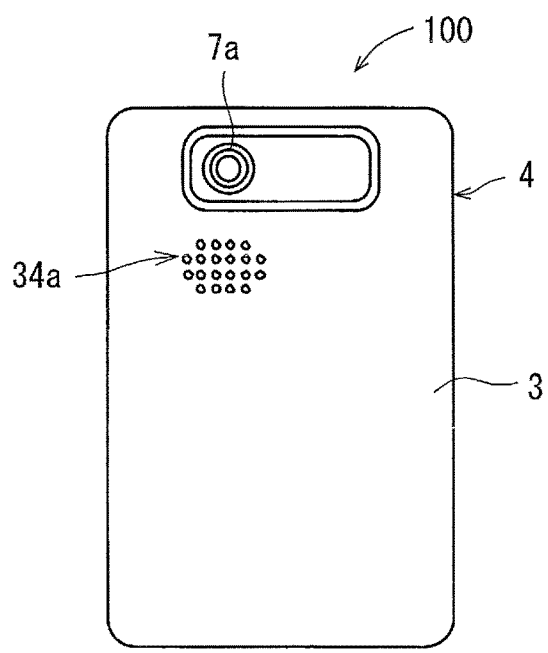
FIG. 2 illustrates a rear view of an exemplary overview of the electronic device.

FIG. 1 illustrates an exemplary overview of a portable electronic device 100 viewed from the front side. FIG. 2 illustrates a rear view showing an exemplary overview of the portable electronic device 100. The portable electronic device 100 is, for example, a tablet, a personal digital assistant (PDA), a mobile phone (including a smartphone), a portable personal computer, or a wearable electronic device (e.g., a wristwatch-type electronic device).

In the illustrations in FIGS. 1 and 2, the electronic device 100 includes a cover panel 2 and a case part 3, and a combination of the cover panel 2 and the case part 3 may form a generally rectangular plate-like casing (hereinafter, also referred to as a "device case") in a plan view.

The cover panel 2 may have a generally rectangular shape in a plan view and constitutes the front part of the electronic device 100, excluding the peripheral part. The cover panel 2 is made of, for example, transparent glass or transparent acrylic resin. Alternatively, the cover panel 2 may be made of, for example, sapphire. Sapphire as referred to herein indicates single crystals consisting primarily of alumina ($Al_2O_3$), and in the present specification, single crystals of $Al_2O_3$ with a purity of approximately 90% or higher. In terms of scratch proofness, the purity of $Al_2O_3$ may be 99% or higher.

The cover panel 2 may also be a composite panel (laminated panel) having a multilayer structure including a layer made of sapphire. For example, the cover panel 2 may be a two-layered composite panel that includes a sapphire layer (sapphire panel) provided on the front face of the electronic device 100 and a glass layer (glass panel) attached to the sapphire layer. The cover panel 2 may also be a three-layered composite panel that includes a sapphire layer (sapphire panel) provided on the front face of the electronic device 100, a glass layer (glass panel) attached to the sapphire layer, and another sapphire layer (sapphire panel) attached to the glass layer. The cover panel 2 may also include a layer made of a crystalline material other than sapphire, such as diamond, zirconia, titania, quartz crystal, lithium tantalate, or aluminum oxynitride.

The case part 3 may constitute the peripheral part of the front part of the electronic device 100, and the side and rear parts of the electronic device 100. The case part 3 is made of, for example, polycarbonate resin.

The front face of the cover panel 2 may include a display area 2a in which various types of information such as text, symbols, graphics, or images are displayed. This display area 2a, for example, has a rectangular shape in a plan view. A peripheral part 2b of the cover panel 2 that surrounds the display area 2a has, for example, a black color with a film or the like applied thereon, and forms a non-display part where information is not displayed. A touch panel 52, which will be described later, may be attached to the rear face of the cover panel 2, and the user is able to give various instructions to the electronic device 100 by operating the display area 2a of the front face of the electronic device 100 with, for example, his or her finger. Note that the user may also use an operation element other than his or her fingers, such as an electrostatic touch panel pen including a stylus, to operate the display area 2a when giving various instructions to the electronic device 100.

The device case 4 includes, for example, operation keys 5. The operation keys 5 are, for example, hardware keys and are provided at, for example, the lower end part of the front face of the cover panel 2.

The touch panel 52 and the operation keys 5 are examples of an input unit that can provide input to the electronic device 100. Various types of input, which will be described later, may be provided via the touch panel 52 or using the operation keys 5.

Electrical Configuration of Portable Electronic Device

Figure 3:
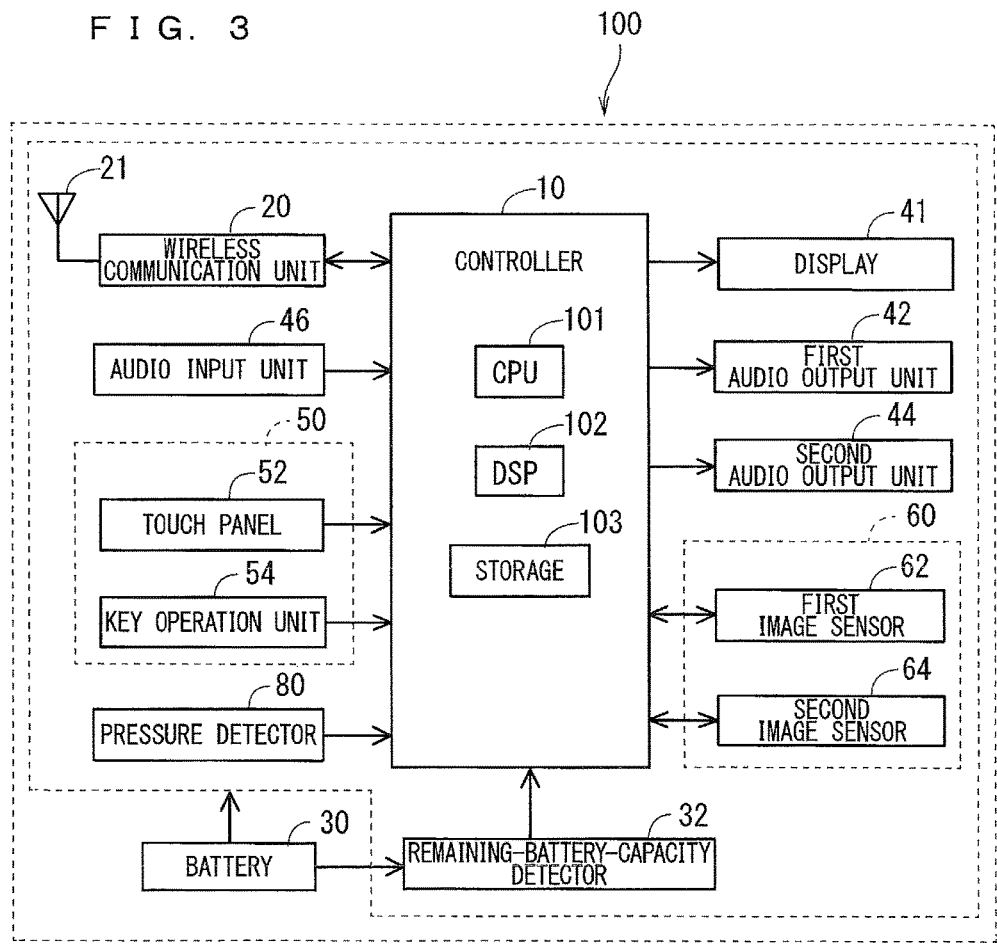
FIG. 3 schematically illustrates an exemplary electrical configuration of the electronic device.

FIG. 3 is a block diagram illustrating an electrical configuration of the portable electronic device 100. The portable electronic device 100 illustrated in FIG. 3 includes, for example, a controller 10, a wireless communication unit 20, a battery 30, a remaining-battery-capacity detector 32, a display 41, a first audio output unit (here, receiver) 42, a second audio output unit (here, speaker) 44, an audio input unit 46, the touch panel 52, a key operation unit 54, an image sensor 60, and a pressure detector 80. These constituent elements of the portable electronic device 100 are housed in the device case 4.

The controller 10 includes, for example, a central processing unit (CPU) 101, a digital signal processor (DSP) 102, and a storage 103 and performs overall management of the operations of the portable electronic device 100 by controlling the other constituent elements of the portable electronic device 100. The storage 103 includes, for example, a read-only memory (ROM) and a random access memory (RAM). The storage 103 stores, for example, a main program and a plurality of application programs (hereinafter, also simply referred to as "applications"), the main program being a control program for controlling the operations of the portable electronic device 100, specifically, the constituent elements of the portable electronic device 100 such as the wireless communication unit 20 and the display 41. Various functions of the controller 10 are implemented by the CPU 101 and the DSP 102 executing various programs stored in the storage 103. The storage 103 may also store various types of setting information about the portable electronic device 100. While the illustration in FIG. 3 includes one CPU 101 and one DSP 102, a plurality of CPUs and a plurality of DPSs may be provided. In this case, these CPUs and DPSs may cooperate with one another to implement various functions. While the storage 103 is located inside the controller 10 in the illustration in FIG. 3, the storage 103 may be provided outside the controller 10. In other words, the storage 103 may be a separate constituent element from the controller 10. Also, some or all of the functions of the controller 10 may be implemented by hardware.

The controller 10 includes at least one processor for providing control and processing capability to perform various functions as described in further detail below. In accordance with various embodiments, the at least one processor 100 may be implemented as a single integrated circuit (IC) or as multiple communicatively coupled IC's and/or discrete circuits. It is appreciated that the at least one processor 100 can be implemented in accordance with various known technologies.

In one embodiment, the processor includes one or more circuits or units configurable to perform one or more data computing procedures or processes by executing instructions stored in an associated memory, for example. In other embodiments, the processor 100 may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The wireless communication unit 20 includes an antenna 21. The wireless communication unit 20 can communicate with external devices. For example, the wireless communication unit 20 can receive signals from other portable electronic devices or communication devices such as web servers connected to the Internet, by the antenna 21 via a base station, for example. The wireless communication unit 20 can perform processing such as amplification and down-conversion on the received signals and output the processed signals to the controller 10. The controller 10 can perform processing such as demodulation on the received input signals. The wireless communication unit 20 can also perform processing such as up-conversion and amplification on transmission signals generated by the controller 10 and wirelessly transmit the processed transmission signals from the antenna 21. The transmission signals from the antenna 21 may be received via the base station or the like by other portable electronic devices or communication devices connected to the Internet.

The display 41 is, for example, a liquid crystal display panel or an organic EL panel. The display 41 can display various types of information such as text, symbols, graphics, and images under the control of the controller 10. The information displayed on the display 41 is displayed in the display area 2a of the front face of the cover panel 2. Thus, the display 41 can be said to display information in the display area 2a.

The touch panel 52 can detect operations made to the display area 2a of the cover panel 2 by an operation element such as a user's finger. The touch panel 52 is, for example, a projection capacitive touch panel and is attached to the rear side of the cover panel 2. When the user operates the display area 2a of the cover panel 2 with an operation element such as his or her finger, a signal corresponding to the operation is input from the touch panel 52 to the controller 10. The controller 10 can identify the content of the operation made to the display area 2a on the basis of the signal received from the touch panel 52 and perform processing according to the content of the operation. Note that the touch panel 52 may be a pressure sensitive touch panel.

The touch panel 52 can also be said to form an input unit in corporation with the display 41 because the touch panel 52 can detect a user operation that is made to the display content displayed on the display 41. Note that the touch panel 52 and the display 41 may be formed as an integral unit. For example, a set of the touch panel 52 and the display 41 may be configured by incorporating a touch sensor into each display element of the display panel. Examples of this configuration include in-cell displays and on-cell displays. Note that a set of the touch panel 52 and the display 42 can be called a "display with a touch sensor," irrespective of whether the touch panel 52 and the display 41 are configured as a single unit or as separate units.

The key operation unit 54 can detect an operation of the user pressing each operation key 5. The key operation unit 54 can detect whether each operation key 5 has been pressed. When the operation key 5 is not pressed, the key operation unit 54 outputs to the controller 10 a non-operation signal indicating that the operation key 5 has not been operated. When the operation key 5 is pressed, the key operation unit 54 outputs to the controller 10 an operation signal indicating that the operation key 5 has been operated. This allows the controller 10 to determine whether each operation key 5 is operated.

The touch panel 52 and the operation keys 5 can function as an input unit 50 that can provide input to the electronic device 100. Note that input using the touch panel 52, which will be described below, can be allocated to the operation keys 5.

In various embodiments, the input unit 50 may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

The first audio output unit (e.g., receiver) 42 can output a received sound and is configured by, for example, a dynamic loudspeaker. The receiver 42 can convert electrical sound signals received from the controller 10 into sound and output the sound. The sound output from the receiver 42 is output to the outside through a receiver hole 80a provided in the front face of the electronic device 100. The volume of the sound output from the receiver hole 80a is less than the volume of the sound output from the second audio output unit 44 through speaker holes 34a.

Instead of the receiver 42, a piezoelectric vibrator may be provided. The piezoelectric vibrator may be controlled by the controller 10 and vibrate on the basis of audio signals. The piezoelectric vibrator is, for example, provided on the rear face of the cover panel 2 and vibrates the cover panel 2 by its own vibrations based on the audio signals. Thus, the vibrations of the cover panel 2 are transmitted as sound to the user's ear. In this case, the receiver hole 80a is unnecessary.

The second audio output unit (e.g., speaker) 44 is, for example, a dynamic loudspeaker and can convert electrical sound signals received from the controller 10 into sound and output the sound. The sound output from the speaker 44 is output to the outside through the speaker holes 34a provided in the rear face of the portable electronic device 100. The volume of the sound output from the speaker holes 34a is controlled to be audible at a distance from the portable electronic device 100. That is, the volume of the second audio output device (speaker 44) is higher than the volume of the first audio output device (the speaker 44 or the piezoelectric vibrator).

The audio input unit 46 is, for example, a microphone and can convert sound that is input from the outside of the portable electronic device 100 into electrical sound signals and output the sound signals to the controller 10. The sound from the outside of the portable electronic device 100 is captured from microphone holes provided in the front face of the cover panel 2 into the electronic device 100 and is input to the microphone 46.

The image sensor 60 includes, for example, a first image sensor 62 and a second image sensor 64. The first image sensor 62 is configured by, for example, an imaging lens 6a and an imaging element and can capture still images and moving images under the control of the controller 10. As illustrated in FIG. 1, the imaging lens 6a is provided on the front face of the portable electronic device 100 and can capture images of objects that are present on the front side (cover panel 2 side) of the portable electronic device 100.

The second image sensor 64 is configured by, for example, an imaging lens 7a and an imaging element and can capture still images and moving images under the control of the controller 10. As illustrated in FIG. 2, the imaging lens 7a is provided on the rear face of the portable electronic device 100 and can capture images of objects that are present on the rear side of the portable electronic device 100.

The pressure detector 80 can detect air pressure (i.e., atmospheric pressure (barometric pressure)) around the pressure detector. The pressure detector 80 can output the detected atmospheric pressure to the controller 10. The pressure detector 80 can measure air pressure, for example, using a pressure-sensitive element via a member such as stemless diaphragm or silicon diaphragm.

The battery 30 is an element that supplies electric power (hereinafter, referred to as "source power") to each constituent element of the portable electronic device 100. The controller 10 can control the supply and shutoff of the source power to the constituent elements of the battery 30. For example, the controller 10 may control switches that are located between the battery 30 and various constituent elements.

The remaining-battery-capacity detector 32 can detect the remaining battery capacity of the battery 30. The remaining-battery-capacity detector 32 includes, for example, a voltage detection circuit that detects the voltage of the battery 30, and calculates the remaining battery capacity on the basis of the detected voltage. The remaining-battery-capacity detector 32 can output the detected remaining battery capacity to the controller 10.

Controller

Figure 4:
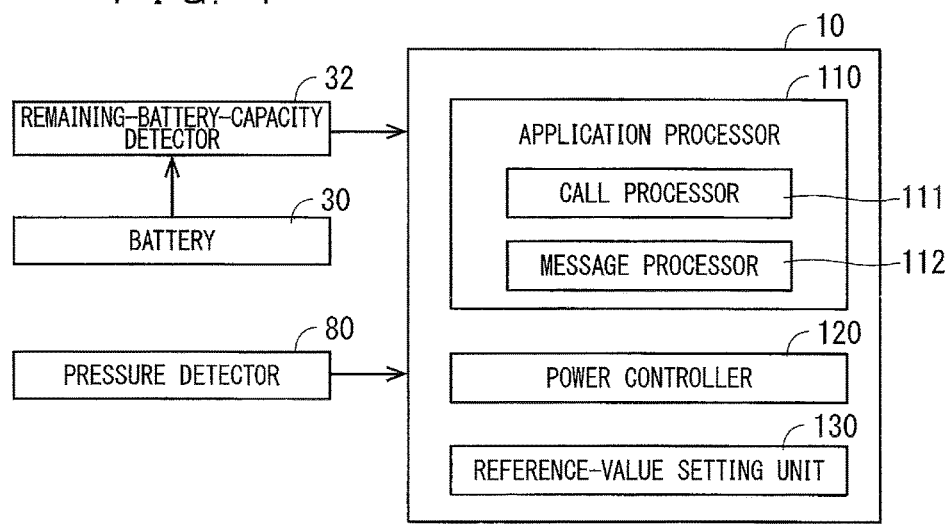
FIG. 4 schematically illustrates an exemplary internal configuration of a controller.

FIG. 4 illustrates a functional block diagram schematically showing an exemplary internal configuration of the controller 10. The controller 10 includes an application processor 110, a power controller 120, and a reference-value setting unit 130. These functional units may be implemented by software, or some or all of these functional units may be implemented by hardware.

The application processor 110 is a processor that executes various functions of the portable electronic device 100 in accordance with input provided by the user to the input unit 50. In response to the user input to the input unit 50, the application processor 110 can read out and execute applications stored in the storage 103 to implement various functions.

The application processor 110 in FIG. 4 includes a call processor 111 and a message processor 112. These applications are executed in response to input provided by the user to the input unit 50. For example, the controller 10 displays elements (e.g., graphic symbols such as icons) that function as buttons for selecting various applications, on the display 41. When the user has performed an operation of selecting a certain element on the display 41, this operation is detected by the touch panel 52 and input to the controller 10. In response to this input, the application processor 110 executes the application corresponding to that element. For example, when the element corresponding to the call processor 111 is operated, the call processor 111 is started up.

The call processor 111 can perform call processing for making a call to a call partner that is another portable electronic device. More specifically, in response to input provided by the user to the input unit 50, the call processor 111 can transmit a call signal to the call partner via the wireless communication unit 20. When an incoming call signal is received from the call partner via the wireless communication unit 20, the call processor 111, for example, causes the second audio output unit 44 to output a ringing sound so that the user is notified of the incoming call. When the call partner has responded to a call signal or when the user has responded to an incoming signal via the input unit 50, the call processor 111 starts a call. During the call, the call processor 111 transmits an audio signal inputted from the audio input unit 46 to the call partner via the wireless communication unit 20 while outputting from, for example, the first audio output unit 42 an audio signal received from the call partner via the wireless communication unit 20. In this way, the call processor 111 establishes a call.

The message processor 112 can transmit and receive messages to and from other portable electronic devices. For example, messages can be exchanged via e-mail or using a social networking service. The message processor 112 can generate a message in response to text input provided by the user to the input unit 50. The message processor 112 can also transmit the generated message to a transmission partner that is another portable electronic device via the wireless communication unit 20, in response to input provided by the user to the input unit 50. When a message is received from the transmission partner via the wireless communication unit 20, the message processor 112 can notify the user of the receipt of the message. For example, the message processor 112 causes the second audio output unit 44 to output sound to notify the user. In response to this, when the user has input an instruction to display the message to the input unit 50, the message processor 112 can display the received message on the display 41 in response to the input. This enables the user to check the message.

Note that the message processor 112 may be able to transmit and receive not only messages but also other information such as images and sounds. For example, when images are captured by the image sensor 60 or when the sounds input from the audio input unit 46 are recorded, the message processor 112 may transmit these images and sound to the transmission partner in response to user input. Alternatively, the message processor 112 may transmit, in response to user input, images or sound acquired from an external device via the wireless communication unit 20.

Conversely, when images or sound is transmitted from the transmission partner, the message processor 112 may display the received image on the display 41 or output the received sound from, for example, the second audio output unit 44 in response to user input.

The power controller 120 can control the turning on and off of the power to the portable electronic device 100. More specifically, the power controller 120 can shut off the supply of the source power when the remaining battery capacity of the battery 30 is less than the shutoff reference value. Note that the remaining battery capacity is detected by the remaining-battery-capacity detector 32, and the shutoff reference value is set by the reference-value setting unit 130, as will be described in detail later. The size relation between the remaining battery capacity and the shutoff reference value can be determined by, for example, a predetermined comparator. The same applies to the case of determining other size relations, which will be described later.

Figure 5:
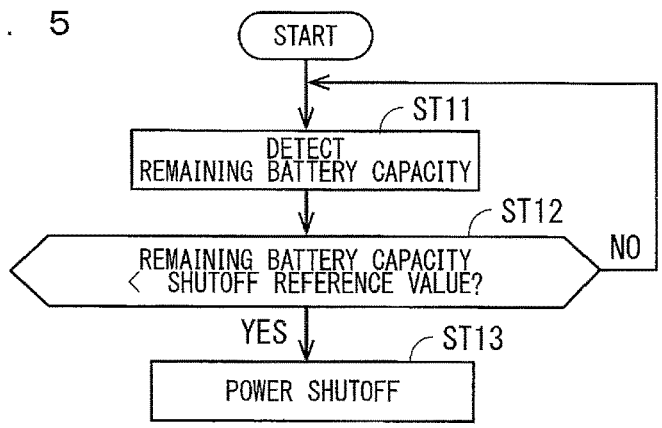
FIG. 5 illustrates a flowchart showing an example of a power shutoff operation due to insufficient remaining battery capacity.

FIG. 5 illustrates a flowchart showing an example of specific operations of the portable electronic device 100. In step ST11, the remaining-battery-capacity detector 32 detects the remaining battery capacity of the battery 30 and outputs the detected remaining battery capacity to the controller 10 (more specifically, the power controller 120). Next, in step ST12, the power controller 120 determines whether the detected remaining battery capacity is less than the shutoff reference value. When it is determined that the remaining battery capacity is not less than the shutoff reference value, step ST11 is executed again.

When it is determined that the remaining battery capacity is less than the shutoff reference value, the power controller 120 shuts off the supply of the source power in step ST13. The shutoff of the supply of the source power as referred to herein includes, for example, shutting off the supply of the source power to the next constituent elements. That is, the power controller 120 shuts off the supply of the source power to constituent elements other than those (e.g., the key operation unit 54 and the controller 10) that are necessary to start up the portable electronic device 100. This shutoff of the supply of the source power can be implemented by, for example, turning off the switch (not shown) located between the battery 30 and each constituent element. At the time of this power shutoff, the controller 10 may terminate functional units other than the power controller 120. For example, when the call processor 111 and the message processor 112 are operating, the operations of these processors are terminated. In the following description, the shutoff of the supply of the source power may also be referred to as "shutoff of power" or simply as "power shutoff."

As described above, when the remaining battery capacity of the battery 30 falls below the shutoff reference value, the supply of the source power is shut off. In the following description, the shutoff of power due to the remaining battery capacity falling below the shutoff reference value is also referred to as "shutoff of power due to insufficient remaining battery capacity."

The remaining battery capacity of the battery 30 can be increased by a battery charger (not shown). When the remaining battery capacity of the battery 30 reaches a value sufficient to start up the portable electronic device 100, the controller 10 can accept input of an instruction to turn on the power to the portable electronic device 100. If, in this situation, the user has provided input to turn on the power to the portable electronic device 100 to the input unit 50 (e.g., an operation key 5), the controller 10 starts up the portable electronic device 100. This startup includes any desired processing for implementing various functions of the portable electronic device 100. For example, the power controller 120 causes the battery 30 to appropriately supply the source power to the aforementioned various constituent elements, and the controller 10 accesses the storage 103 to recognize various applications and various types of setting information that are stored in the storage 103.

Other than shutoff of power due to insufficient remaining battery capacity, the power controller 120 can also shut off the supply of the source power in response to user input. For example, when the user has provided input to shut off the supply of the source power, to the input unit 50 (e.g., an operation key 5), the power controller 120 shuts off the supply of the source power in response.

The reference-value setting unit 130 can set the shutoff reference value. For example, the initial value of the shutoff reference value may be set in advance and stored in, for example, the storage 103. This initial value is, for example, a value of remaining battery capacity with which the battery 30 is unable to start up the portable electronic device 100.

The reference-value setting unit 130 can increase and update the shutoff reference value when it is determined that the functions of the portable electronic device 100 are necessary, even after the supply of the source power is shut off due to insufficient remaining battery capacity. For example, assume the case in which the supply of the source power is shut off when the user is mountain climbing. If the user becomes lost in this situation, it would be extremely inconvenient for the user not to be able to use the portable electronic device 100. This is because it is difficult for the user to grasp his or her location on the mountain trail, and various functions of the portable electronic device 100 would be especially helpful in such a case.

In view of this, the shutoff reference value is increased in advance, for example when the user is mountain climbing. By doing so, even if the supply of the source power is shut off due to insufficient remaining battery capacity, the user is able to start up the portable electronic device 100 again and use the functions of the portable electronic device 100. For example, the user is able to seek outside help by communicating with (or making a call to) an external device with the portable electronic device 100.

Incidentally, if the user is climbing up a mountain, the altitude of his or her location increases. Also, the atmospheric pressure decreases as the altitude increases. Thus, it can be said that when the atmospheric pressure is low, the altitude of that location is high, such as in the mountains. At this time, it can be determined that the need to use the functions of the portable electronic device 100 will increase even after power shutoff. Thus, the reference-value setting unit 130 may increase the shutoff reference value in accordance with a drop in the atmospheric pressure detected by the pressure detector 80. The increased shutoff reference value is, for example, a value of remaining battery capacity with which the battery 30 is able to start up the portable electronic device 100 and the controller 10 is able to transmit signals to the outside via the wireless communication unit 20.

Figure 6:
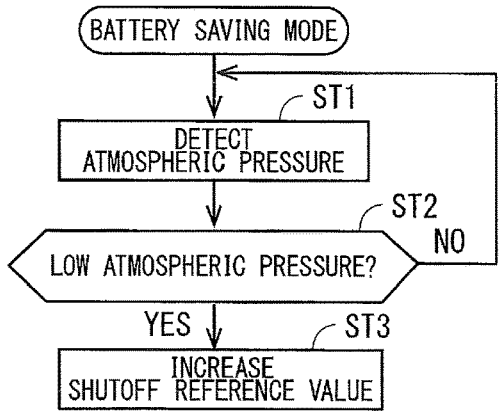
FIG. 6 illustrates a flowchart showing an example of an operation of increasing a shutoff reference value.

FIG. 6 illustrates a flowchart showing an example of specific operations of the portable electronic device 100. The term "battery saving mode" in the illustration in FIG. 6 will be described later. First, in step ST1, the pressure detector 80 detects the atmospheric pressure and outputs the detected atmospheric pressure to the controller 10 (to be specific, the reference-value setting unit 130). Next, in step ST2, the reference-value setting unit 130 determines whether the detected atmospheric pressure is less than a pressure reference value. For example, the pressure reference value may be set in advance and stored in, for example, the storage 103. When it is determined that the atmospheric pressure is not less than the pressure reference value, step ST1 is executed again. When it is determined that the atmospheric pressure is less than the pressure reference value, the reference-value setting unit 130 increases the shutoff reference value in step ST3.

The shutoff reference value can thus be increased, for example when the user is mountain climbing. Hence, when the user becomes lost in the mountain, he or she is able to start up the portable electronic device 100 again without charging the battery and transmit signals to the outside even after the supply of the source power is shut off due to insufficient remaining battery capacity. For example, the portable electronic device 100 can make a call to the outside via the call processor 111 or can transmit a message to the outside via the message processor 112. Accordingly, the user is able to make contact with the outside and notify that he or she has become lost in the mountain, and is able to seek outside help.

Note that the shutoff reference value may be increased when the altitude of the user's location is higher by a predetermined value or more than the altitude of the user's daily living area. To implement this, the following value may be adopted as an atmospheric-pressure reference value. That is, the atmospheric-pressure reference value may be a value obtained by subtracting a predetermined value from the atmospheric pressure (e.g., average value) in the user's daily living area. The atmospheric pressure in the user's daily living area may be input by the user using the input unit 50, or may be an average value of detected atmospheric pressures. The predetermined value may be set in advance or may be input by the user using the input unit 50. In this case, the shutoff reference value can be increased when the atmospheric pressure is lower by a predetermined value or more than the atmospheric pressure in the daily living area.

It is also expected that it would take more time to go down a mountain as the altitude increases. Thus, it is desirable to extend the operating time of the portable electronic device 100 as the altitude increases. In view of this, the reference-value setting unit 130 may increase the shutoff reference value as the atmospheric pressure decreases. For example, the shutoff reference value may be increased continuously or discretely with decreasing atmospheric pressure. In the case of discretely increasing the shutoff reference value, for example, the shutoff reference value may be a first value when the atmospheric pressure belongs to a first range, and the shutoff reference value may be a second value higher than the first value when the atmospheric pressure belongs to a second range lower than the first range. Moreover, the shutoff reference value may be a third value higher than the second value when the atmospheric pressure belongs to a third range lower than the second range.

In this way, increasing the shutoff reference value with decreasing atmospheric pressure increases the possibility that even if the user is almost at the top of a mountain, he or she is able to use the portable electronic device 100 until he or she goes down the mountain.

When the user is in, for example, a flat area, a need to use the portable electronic device 100 after power shutoff is lower than that when the user becomes lost on a mountain trail. In one embodiment, the user who is in, for example, a flat area is able to use the portable electronic device 100 in a normal mode because the shutoff reference value is small when the atmospheric pressure is high. That is, this saves the user who is in, for example a flat area from having to start up the portable electronic device 100 for use after power shutoff.

Startup in Emergency Mode

By increasing the shutoff reference value as described above, the portable electronic device 100 can be started up without charging the batter, even after power shutoff due to insufficient remaining battery capacity. At this time, the portable electronic device 100 may be started up in an emergency mode with small power consumption. That is, because the remaining battery capacity of the battery 30 at the time of power shutoff due to insufficient remaining battery capacity is not very high, the portable electronic device 100 is started up in the emergency mode with small power consumption in order to give higher priority to increasing the operating time of the portable electronic device 100. More specifically, the power controller 120 starts up the portable electronic device 100 in the emergency mode when an instruction to turn on the power to the portable electronic device 100 is input to the input unit 50 in a situation where the supply of the source power to the portable electronic device 100 is shut off on the basis of the increased shutoff reference value.

In this emergency mode, for example, predetermined applications may be disabled. For example, at least one of the applications, excluding the call processor 111 and the message processor 112, is disabled in the emergency mode. For example, in the case where the application processor 110 can execute a TV application for displaying a TV show on the display 41, this TV application may be disabled.

In the emergency mode, the display 41 does not need to display elements (e.g., icons) for selecting applications that are disabled. Thus, the user is difficult to perform an operation to start up an application that is disabled.

In this way, disabling applications in the emergency mode avoids a reduction in the remaining battery capacity due to execution of the applications. Thus, the operating time of the portable electronic device 100 can be lengthened.

In the emergency mode, it is unnecessary to supply power to constituent elements that are used in only applications that are disabled. For example, in the case where the image sensor 60 is used in only applications that are disabled, the supply of the source power from the battery 30 to the image sensor 60 may be shut off. In the case where the portable electronic device 100 is capable of short-range or near-field wireless communication, and applications for the communication are used in only applications that are disabled, the supply of the source power to these communication applications may be shut off. In this way, shutting off the supply of the source power reduces the power consumption of the portable electronic device 100 and thereby further delays a reduction in the remaining battery capacity of the battery 30, which in turn lengthens the operating time of the portable electronic device 100.

Note that the call processor 111 and the message processor 112 are also referred to as "communication applications" in the following description, because these processors communicate with the outside. Since at least one of the communication applications is enabled even in the emergency mode as described above, the user is able to make contact with the outside via the communication application even in the emergency mode. Moreover, the user is able to make contact with the outside for a relatively long period of time because the power consumption in the emergency mode is low as described above.

Note that applications do not necessarily have to be disabled, and the supply of the source power to at least one constituent element need only be shut off. Even in this case, the power consumption can be reduced. Even in the emergency mode, the power shutoff of the constituent element does not necessarily have to be maintained all the time. When the constituent element becomes necessary, power supply from the battery 30 to that constituent element may be started. This enables the user to execute an application corresponding to that constituent element.

Applications to be disabled and constituent elements targeted for power shutoff can be appropriately set. For example, all applications other than the communication applications may be disabled, and the supply of the source power to all constituent elements that are used in only the applications that are disabled may be shut off.

Figure 7:
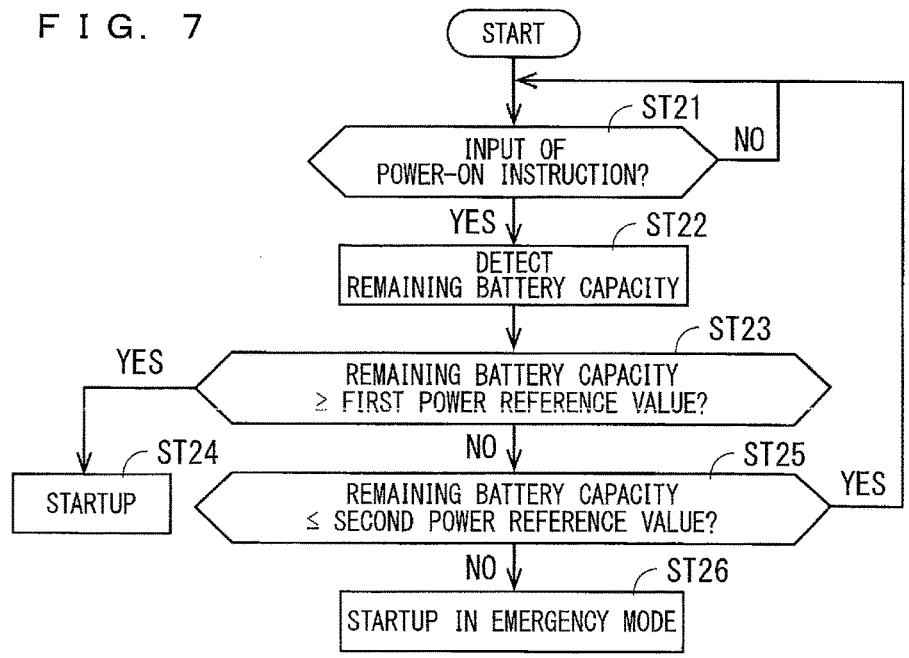
FIG. 7 illustrates a flowchart showing an example of an operation of starting up the portable electronic device.

FIG. 7 illustrates a flowchart showing an example of specific operations of the portable electronic device 100 performed at the time of startup. In step ST21, the controller 10 determines whether the user has provided input of an instruction to turn on the power to the portable electronic device 100, to the input unit 50. When it is determined that the input has not been provided, step ST21 is executed again. When it is determined that the input has been provided, the remaining-battery-capacity detector 32 detects the remaining battery capacity of the battery 30 and outputs the detected remaining battery capacity to the controller 10 in step ST22.

Next, in step ST23, the controller 10 determines whether the remaining battery capacity is higher than a first power reference value. The first power reference value is, for example, higher than the increased shutoff reference value and may be stored in advance in, for example, the storage 103. When it is determined that the remaining battery capacity is higher than or equal to the first power reference value, the controller 10 starts up the portable electronic device 100 normally, instead of in the emergency mode, in step ST24. At this startup, all applications are enabled, for example. That is, when the remaining battery capacity is a sufficient value, the portable electronic device 100 is started up normally, instead of in the emergency mode. Thus, the user is able to normally start up the portable electronic device 100 by charging the battery 30, even after power shutoff due to insufficient remaining battery capacity.

When it is determined that the remaining battery capacity is less than the first power reference value, the controller 10 determines whether the remaining battery capacity is less than a second power reference value in step ST25. The second power reference value is a value that is not sufficient to start up the portable electronic device 100, and is, for example, higher than or equal to the initial value of the shutoff reference value and set to a value less than the increased shutoff reference value. The second power reference value is also less than the first power reference value. The second power reference value may be stored in, for example, the storage 103. When it is determined that the remaining battery capacity is less than or equal to the second power reference value, step ST21 is executed again. That is, the portable electronic device 100 is not started up when the battery 30 has not stored sufficient remaining battery capacity to start up the portable electronic device 100.

When it is determined that the remaining battery capacity is higher than the second power reference value, the controller 10 starts up the portable electronic device 100 in the emergency mode in step ST26. That is, when it is determined that the remaining battery capacity is higher than the second power reference value and less than the first power reference value, it is assumed that the battery has not been charged after the supply of the source power was shut off on the basis of the increased shutoff reference value, and therefore, the portable electronic device 100 is started up in the emergency mode.

Weather

The atmospheric pressure also changes with atmospheric flow even if the altitude is constant. When the atmospheric pressure increases with atmospheric flow, the weather in a target area is likely to be fine with less or no cloud cover. On the other hand, when the atmospheric pressure decreases, the weather in that area is likely to be raining or snowing with more cloud cover.

When it rains, visibility will decrease as compared to when it is fine. Thus, the user who becomes lost can more easily grasp his or her location on a bright day. In other words, when it rains or snows, it is difficult for the user to grasp his or her location, and this increases the need to use the portable electronic device 100. In particular, when it rains or snows in the mountains, it is more difficult for the user to accurately grasp his or her location.

In one embodiment, the shutoff reference value is increased when the atmospheric pressure is low. Thus, the shutoff reference value is increased when it is likely to rain or snow. Accordingly, even if the supply of the source power is shut off due to insufficient remaining battery capacity in a situation where the user became lost in the rain or snow, the user is able to start up the portable electronic device 100 again and use the device.

Condition 1

Figure 8:
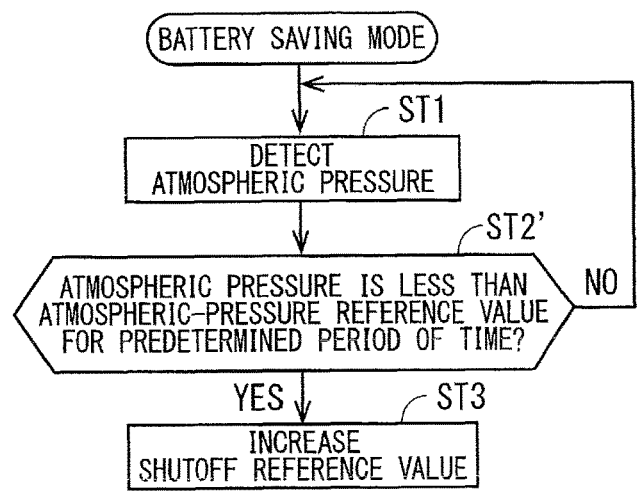
FIG. 8 illustrates a flowchart showing an example of the operation of increasing the shutoff reference value.

The reference-value setting unit 130 may increase the shutoff reference value when the atmospheric pressure is less than the atmospheric-pressure reference value for a predetermined period of time. This predetermined period of time can be timed using a predetermined clocking circuit (e.g., timer circuit). The predetermined period of time may also be set in advance and stored in, for example, the storage 103. FIG. 8 illustrates a flowchart showing an example of specific operations of the portable electronic device 100. In step ST1, the pressure detector 80 detects the atmospheric pressure and outputs the detected atmospheric pressure to the reference-value setting unit 130. Next, in step ST2', the reference-value setting unit 130 determines whether the atmospheric pressure is less than the pressure reference value for a predetermined period of time. If the determination result is in the negative, step ST1 is executed again. If the determination result is in the affirmative, the reference-value setting unit 130 increases the shutoff reference value in step ST3.

In this case, the shutoff reference value does not increase even if the atmospheric pressure is instantaneously reduced due to noise or the like. This avoids an unnecessary increase in the shutoff reference value.

When the shutoff reference value is discretely increased in accordance with a drop in the atmospheric pressure, the following processing may be performed. Specifically, the shutoff reference value may be the first value when the atmospheric pressure belongs to the first range for a predetermined period of time, and the shutoff reference value may be the second value higher than the first value when the atmospheric pressure belongs to the second range lower than the first range for a predetermined period of time.

Condition 2

The reference-value setting unit 130 may increase the shutoff reference value on the basis of the amount of change in atmospheric pressure per predetermined period of time. That is, the shutoff reference value may be increased when the amount of change in atmospheric pressure exceeds a predetermined change reference value. This change reference value may be set in advance and stored in, for example, the storage 103.

When the user goes up and down along a steep mountain trail, the amount of change in atmospheric pressure is relatively great. If the user becomes lost on such a steep mountain trail, he or she may not easily grasp his or her location due to relatively great physical exhaustion. This increases the need to use the portable electronic device 100. Thus, it is also desirable to increase the shutoff reference value in such cases.

There are also cases where the weather suddenly turns bad when the atmospheric pressure decreases sharply due to atmospheric flow. Such bad weather reduces visibility, and this increases the need for the portable electronic device 100 when the user becomes lost. Thus, it is also desirable to increase the shutoff reference value in such cases.

Figure 9:
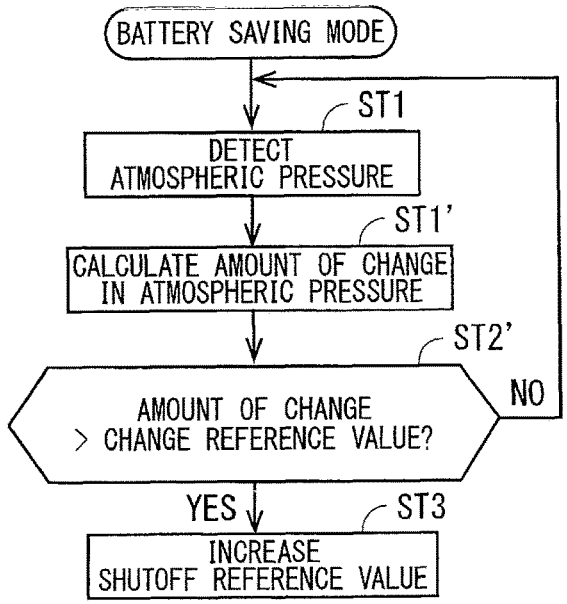
FIG. 9 illustrates a flowchart showing an example of the operation of increasing the shutoff reference value.

FIG. 9 illustrates a flowchart showing an example of specific operations of the portable electronic device 100. In step ST1, the pressure detector 80 detects the atmospheric pressure and outputs the detected atmospheric pressure to the reference-value setting unit 130. Next, in step ST1', the reference-value setting unit 130 calculates a difference between the detected atmospheric pressure and the previously detected atmospheric pressure to calculate the amount of change per unit of time. Next, in step ST2', the reference-value setting unit 130 determines whether the amount of change is less than the change reference value. The change reference value may be set in advance and stored in, for example, the storage 103. If the determination result is in the negative, step ST1 is executed again. If the determination result is in the affirmative, the reference-value setting unit 130 increases the shutoff reference value in step ST3.

Note that the shutoff reference value may be increased continuously or discretely with increasing amount of change.

Location Information on Portable Electronic Device

Figure 10:
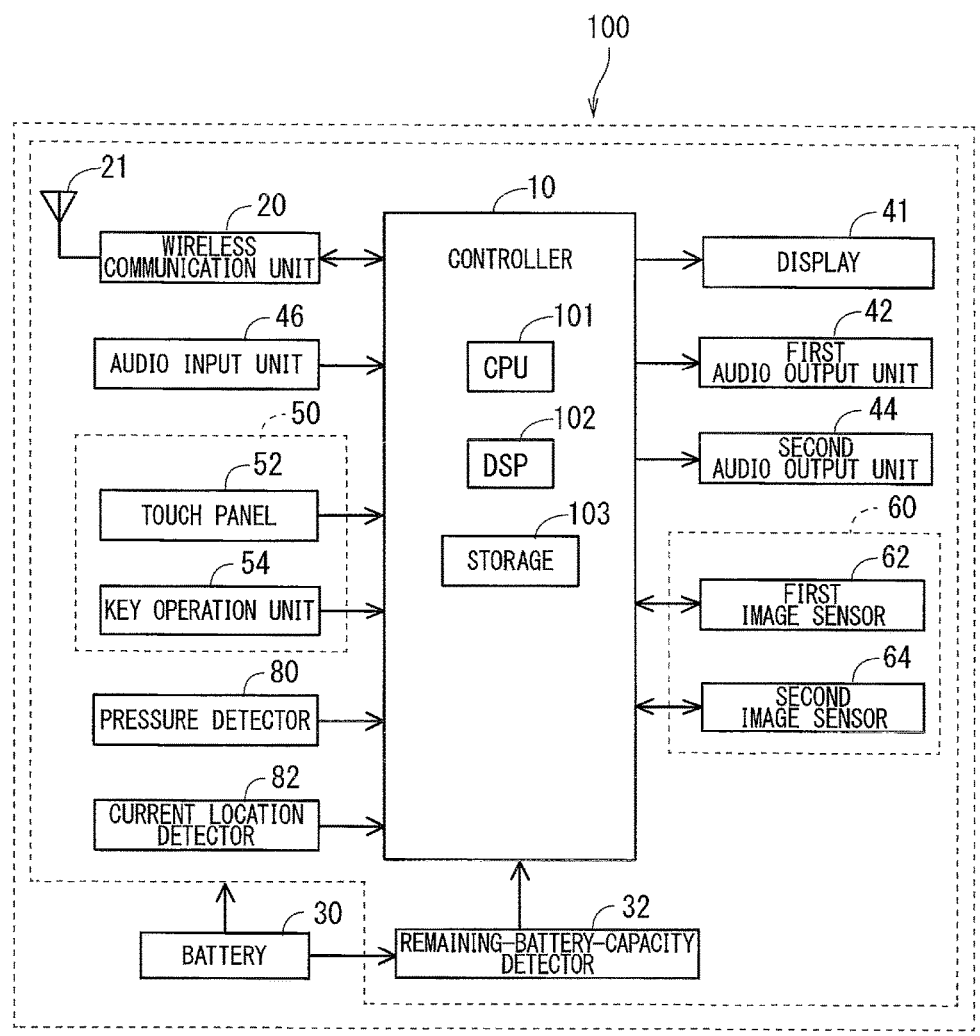
FIG. 10 schematically illustrates an exemplary electrical configuration of an electronic device.

FIG. 10 schematically illustrates an exemplary electrical configuration of the portable electronic device 100. As compared with FIG. 3, the portable electronic device 100 in FIG. 1 further includes a current location detector 820. The current location detector 82 can detect the current location of the portable electronic device 100. For example, the current location detector 82 may detect the current location, using a global positioning system (GPS). With this GPS, the current location detector 82 can receive signals from a plurality of artificial satellites and calculate the current location of the portable electronic device 100 on the basis of the received signals.

The message processor 112 can transmit the current location detected by the current location detector 82 to another portable electronic device via the wireless communication unit 20 in response to input provided by the user to the input unit 50. Thus, the user's location can be transmitted to the outside.

When the supply of the source power is shut off due to insufficient remaining battery capacity, the power controller 120 can store the current location detected by the current location detector 82 in, for example, the storage 103 before the shutoff. In other words, power is shut off after the current location is stored in, for example, the storage 103. Thus, the storage 103 stores the current location immediately before power shutoff. Here, the storage 103 may be a nonvolatile storage.

Figure 11:
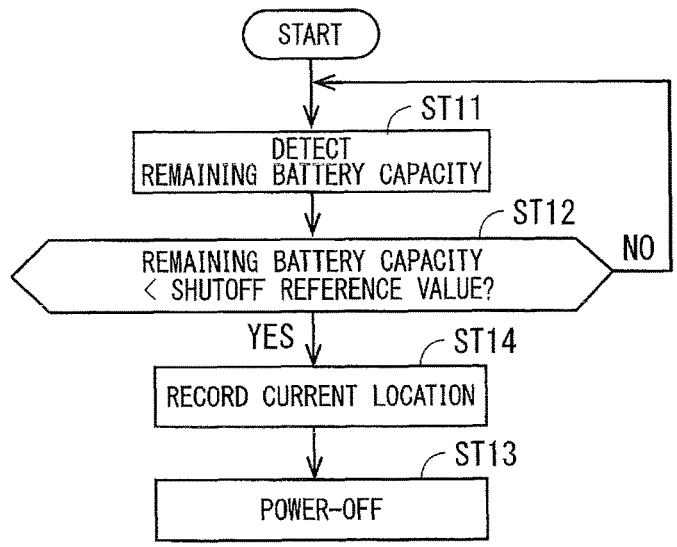
FIG. 11 illustrates a flowchart showing an example of the power shutoff operation.

FIG. 11 illustrates a flowchart showing an example of specific operations of the portable electronic device 100. As compared with FIG. 5, FIG. 11 further includes step ST14. Step ST14 is executed when the affirmative determination has been made in step ST12. In step ST14, the power controller 120 stores the current location detected by the current location detector 82 in, for example, the storage 103. The power controller 120 then shuts off the supply of the source power in step ST13.

After the supply of the source power to the portable electronic device 100 is shut off, the user starts up the portable electronic device 100 again. In response to the input provided by the user to the input unit 50, the message processor 112 reads out the current location immediately before power shutoff from the storage 103 and transmits this current location to another portable electronic device. Thus, the user is able to notify his or her location to the outside. This enables an outside person to easily guide the user through a call or message, or to easily go and rescue the user.

Note that the conditions for storing the current location immediately before power shutoff may additionally include a condition that the shutoff reference value be higher than the initial value. This is because if the initial value is a value that is not sufficient to start up the portable electronic device 100, the portable electronic device 100 will not be started up without charging the battery after power shutoff. That is, the portable electronic device 100 cannot be started up, and therefore, the current location cannot be transmitted to the outside. Thus, when the shutoff reference value is the initial value, there is no need to record the current location immediately before power shutoff. Conversely, when the shutoff reference value is higher than the initial value, the current location is stored immediately before power shutoff due to insufficient remaining battery capacity. This avoids an unnecessary storage operation.

Battery Saving Mode

The aforementioned mode in which the shutoff reference value is increased (hereinafter, referred to as the "battery saving mode") and the aforementioned mode in which the shutoff reference value is not increased (hereinafter, referred to as the "normal mode") may be switched under predetermined conditions.

Figure 12:
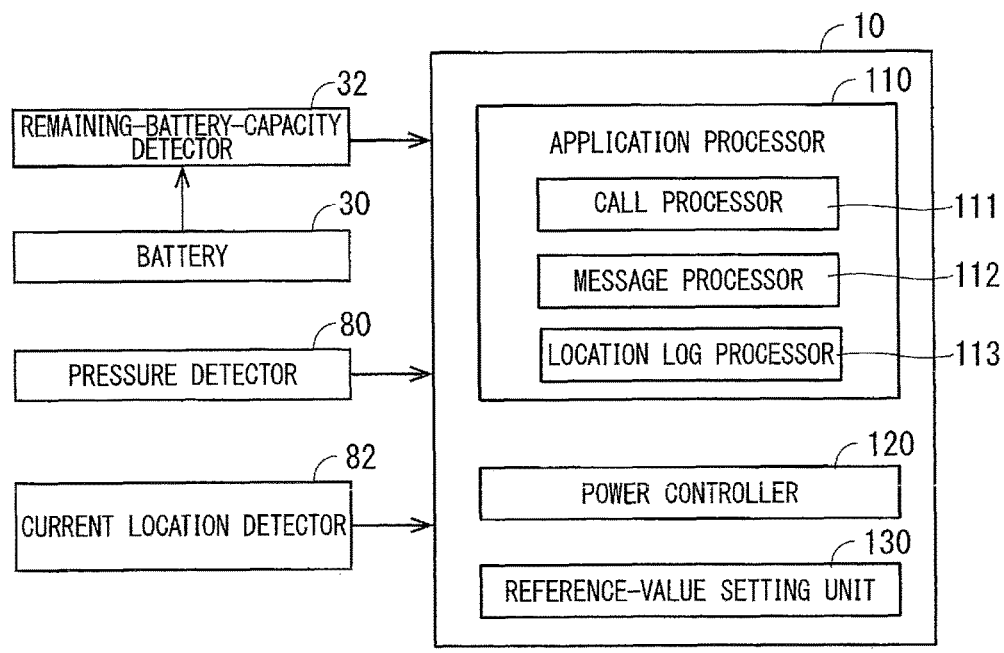
FIG. 12 schematically illustrates an exemplary internal configuration of the controller.

FIG. 12 schematically illustrates an exemplary internal configuration of the controller 10. As compared with FIG. 4, the application processor 110 in FIG. 12 further includes a location log processor 113. This location log processor 113 can perform log processing, which will be described next, in response to input provided by the user to the input unit 50. That is, the location log processor 113 can store current locations that are repeatedly detected by the current location detector 82, as log information. Thus, the route of travel of the user is recorded as log information. The location log processor 113 can also end the operation of recording the log information, in response to input provided by the user to the input unit 50.

The portable electronic device 100 may be placed in the battery saving mode on condition that input to execute log processing has been provided to the input unit 50. For example, when the user wants to record his or her own route while mountain climbing, he or she provides input to record log information, to the input unit 50. In response to this input, the location log processor 113 can start recording log information, and the controller 10 can employ the battery saving mode.

Thus, the battery saving mode can be employed when there is a high need for the battery saving mode.

Figure 13:
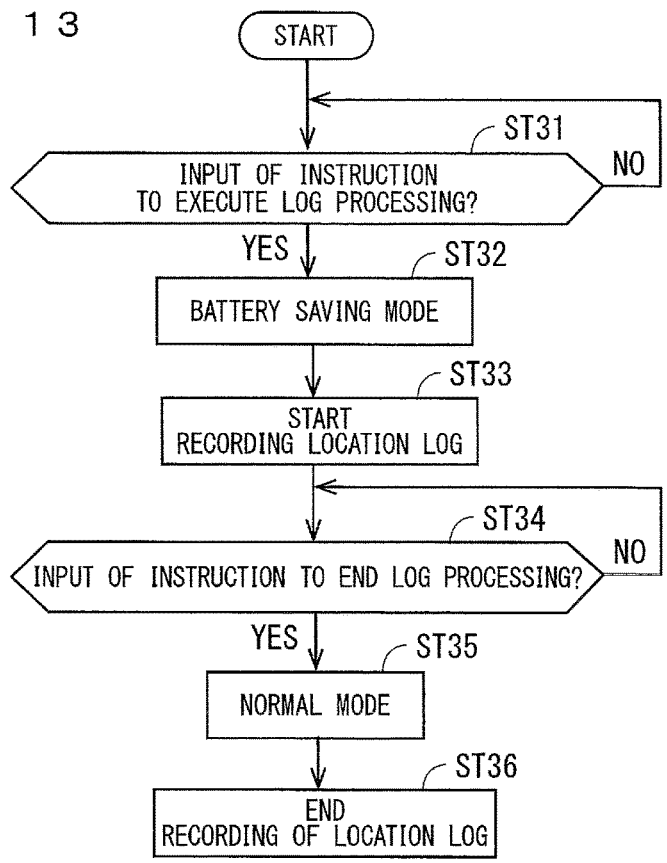
FIG. 13 illustrates a flowchart showing an example of an operation of adopting a normal mode and a battery saving mode.

FIG. 13 illustrates a flowchart showing an example of specific operations of the portable electronic device 100. In step ST31, the controller 10 determines whether an instruction to execute log processing is input to the input unit 50. For example, the location log processor 113 displays an element that functions as a button for inputting the execution instruction, on the display 41. When this element is operated, it is determined that the execution instruction has been input. When the instruction to execute log processing is not input, step ST31 is executed again.

When the instruction to execute log processing has been input, the controller 10 employs the battery saving mode in step ST32. That is, the reference-value setting unit 130 increases the shutoff reference value in accordance with a drop in the atmospheric pressure. Next, in step ST33, the location log processor 113 starts recording the current location detected by the current location detector 82 as log information. Note that steps ST32 and ST33 may be executed in the reverse order.

Also, the battery saving mode may be ended and the normal mode may be employed on condition that input to end log processing has been provided to the input unit 50. For example, when the user has finished mountain climbing and wants to end the route recording, the battery saving mode is ended and the normal mode is employed.

In the illustration in FIG. 13, the controller 10 determines whether an instruction to end log processing has been input to the input unit 50, in step ST34 performed after step ST33. For example, the location log processor 113 displays an element that functions as a button for inputting an instruction to end log processing, on the display 41. When this element is operated, it is determined that the end instruction has been input. When the end instruction is not input, step ST34 is executed again.

When the end instruction has been input, the controller 10 employs the normal mode in step ST35. Along with this, the reference-value setting unit 130 may return the shutoff reference value to the initial value. Next, the location log processor 113 ends the log processing in step ST36. Note that steps ST35 and ST36 may be executed in the reverse order.

In the aforementioned example, the employment of the battery saving mode and the execution of the log processing are both performed in response to a single input. That is, this input serves as both the input to employ the battery saving mode and the input to instruct the execution of the log processing. Nevertheless, the input to employ the battery saving mode may serve as other input, or may be dedicated input to employ the battery saving mode.

Separating Between Change Caused by Altitude and Change Caused by Atmospheric Flow As described above, the atmospheric pressure decreases as the altitude increases, and also changes with atmospheric flow. It is thus intended to separate the amount of change in atmospheric pressure detected by the pressure detector 80 into the amount of change caused by altitude and the amount of change caused by atmospheric flow. The rate of change in altitude (the amount of change per unit of time) during general mountain climbing can be thought of as being a certain value or less, and a change in atmospheric pressure that exceeds this value can be taken as a change that is caused not by the change in altitude but by atmospheric fluctuations.

In view of this, the reference-value setting unit 130 calculates the amount of change in atmospheric pressure per unit of time and compares a difference between the calculated value and a predetermined determination value. This determination value may be set and stored in advance. When the amount of change in atmospheric pressure exceeds this determination value, the amount by which the amount of change in atmospheric pressure exceeds the determination value can be determined as the amount of change caused by atmospheric flow. Thus, the shutoff reference value may be increased in the following manner, depending on whether the amount of change is greater than the determination value or less than the determination value. That is, when the amount of change is less than the determination value, the reference-value setting unit 130 increases the shutoff reference value in accordance with the amount of change, and when the amount of change is greater than the determination value, the reference-value setting unit 130 increases the shutoff reference value by adding to the shutoff reference value a first amount of increase that is based on the determination value and a second amount of increase that depends on the difference between the amount of change and the determination value.

That is, when the amount of change is less than the determination value, it is conceivable that this change is caused by the change in altitude, and therefore, the shutoff reference value is increased by the first amount of increase, which is based on the amount of change in altitude. On the other hand, when the amount of change is greater than the determination value, the amount by which the amount of change exceeds the determination value can be thought of as being caused by atmospheric flow. Thus, an increment in the shutoff reference value due to altitude (the first amount of increase) and an increment in the shutoff reference value due to atmospheric flow (the second amount of increase) are distinguished when increasing the shutoff reference value. Accordingly, the shutoff reference value can be appropriately increased in accordance with the situation.

Figure 14:
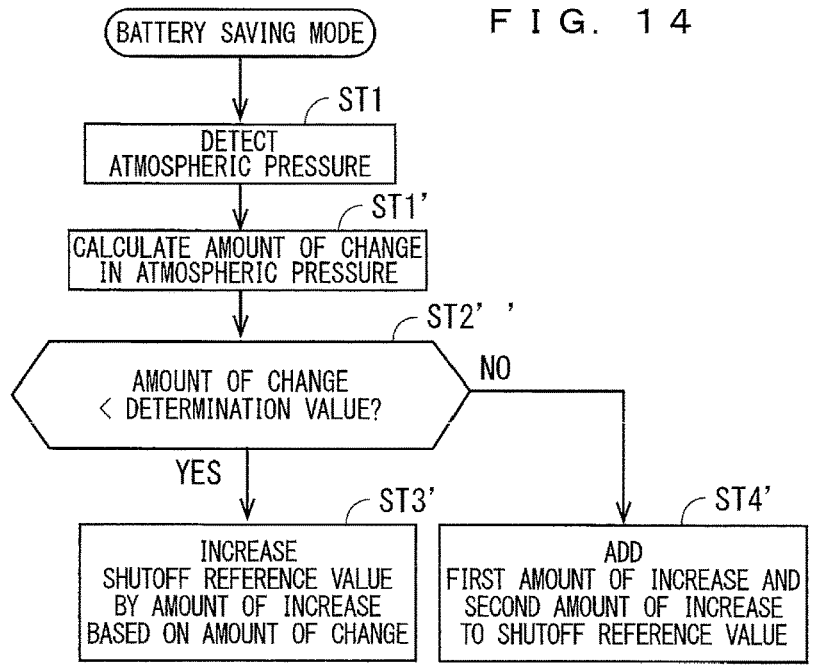
FIG. 14 illustrates a flowchart showing an example of the operation of increasing the shutoff reference value.

FIG. 14 illustrates a flowchart showing an example of specific operations of the portable electronic device 100. The operations in FIG. 14 are, for example, repeatedly executed at predetermined time intervals. In step ST1, the pressure detector 80 detects the atmospheric pressure and outputs the detected atmospheric pressure to the reference-value setting unit 130. Next, the reference-value setting unit 130 calculates a difference between the previously detected atmospheric pressure and the currently detected atmospheric pressure as the amount of change in step ST1'. Then, in step ST2", the reference-value setting unit 130 determines whether the amount of change is less than the determination value. When the amount of change is less than the determination value, in step ST3' the reference-value setting unit 130 increases the shutoff reference value by the amount of increase based on the amount of change. For example, the amount of increase may be set to a higher value as the amount of change increases. Alternatively, a fixed amount of increase may be added to the shutoff reference value when the amount of change is greater than the change reference value, which is less than the determination value.

When it is determined in step ST2" that the amount of change is greater than the determination value, in step ST4' the reference-value setting unit 130 increases the shutoff reference value by adding to the shutoff reference value, the first amount of increase that is based on the determination value and the second amount of increase that depends on the difference between the amount of change and the determination value.

The determination value may be a preset value, or may be set on the basis of the past amount of change in atmospheric pressure. For example, the determination value may be a statistic (e.g., average value, median value, or maximum value) of the previous amounts of change in atmospheric pressure. This statistic may be calculated by, for example, the reference-value setting unit 130. In this case, the determination value is calculated on the basis of previous changes in atmospheric pressure. Thus, the determination value can be more appropriately set in accordance with the situation.

Second Embodiment

In the specific examples of the first embodiment, the shutoff reference value is changed on the basis of atmospheric pressure. In a second embodiment, the shutoff reference value is changed on the basis of the current location detected by the current location detector 82. An exemplary electrical configuration of a portable electronic device 100 according to the second embodiment is similar to that illustrated in FIG. 10.

Location

In the second embodiment, the shutoff reference value is not increased when the user is in a predetermined first area, and the shutoff reference value is increased when the user is in a second area. The details will be described below.

The storage 103 may store map information. This map information includes, for example, road data. The road data includes link data and node data. The node data indicates points such as intersections, forks, and junctions in each road, and the link data indicates sections of road that connect nodes. The link data includes information such as an identification number for use in identifying each section of road, road length indicating the length of each section of road, coordinates (e.g., latitude and longitude) of the starting point and end point of each section of road, and road type (e.g., national road).

This map information also includes area information. This area information indicates a first area (hereinafter, also referred to as a "non-increase area") and a second area (hereinafter, also referred to as an "increase area"). The non-increase area includes, for example, urban areas, and the increase area includes, for example, areas other than urban areas. These areas may be set in advance.

Becoming lost in an urban area will not cause a critical situation for the user. This is because there are various and frequent public transportations and many people in urban areas, and therefore, the user is able to easily find a proper route to the destination. On the other hand, there are few public transportations or few people in areas other than urban areas (e.g., mountain areas), and therefore once the user becomes lost, he or she may not easily find a proper route.

Figure 15:
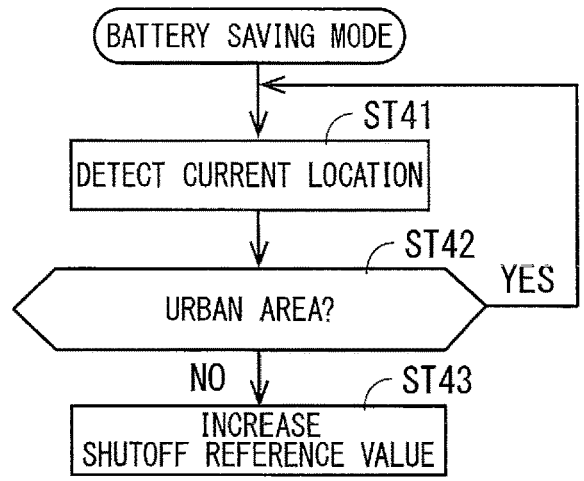
FIG. 15 illustrates a flowchart showing an example of the operation of increasing the shutoff reference value.

FIG. 15 illustrates a flowchart showing an example of specific operations of the portable electronic device 100. In step ST41, the reference-value setting unit 130 determines whether the current location detected by the current location detector 82 belongs to a non-increase area (here, an urban area). When it is determined that the current location belongs to a non-increase area, step ST41 is executed again. When it is determined that the current location does not belong to any non-increase area, the reference-value setting unit 130 increases the shutoff reference value in step ST43.

With this configuration, even if the supply of the source power to the portable electronic device 100 is shut off due to insufficient remaining battery capacity in a situation where the user has become lost in an area other than an urban area, the user is able to start up and use the portable electronic device 100. Thus, the user is able to appropriately cope with the situation by using various functions of the portable electronic device 100.

While in this example, whether to increase the shutoff reference value is determined depending on whether the user is in an urban area or not, the area is not limited to urban areas. The user is able to easily find a proper route even if he or she becomes lost in a familiar area such as his or her daily living area. In contrast, the user may not easily find a proper route when he or she becomes lost in an unfamiliar area. In view of this, the shutoff reference value may not be increased when the user is in a familiar area, and the shutoff reference value may be increased when the user in an unfamiliar area. That is, the increase area may be an area that is unfamiliar to the user, and the non-increase area may be an area that is familiar to the user. This area setting may be made by, for example, the user using the input unit 50. Accordingly, even if the supply of the source power is shut off due to insufficient remaining battery capacity in a situation where the user becomes lost in an unfamiliar area, the user is able to start up and use the portable electronic device 100.

Also, when the user is travelling on a main road (e.g., a national road), the wideness of the road provides the user relatively good visibility, and there are often road signs that indicate destinations. Thus, the user is able to easily find a proper route even if he or she becomes lost on such a main road. On the other hand, roads other than main roads are often narrower than main roads, and provide the user relatively poor visibility. There are also fewer road signs that indicate destinations. Thus, the user who becomes lost on a road other than main roads may not easily find a proper route, as compared with the case where he or she becomes lost on a main road. Accordingly, the need for the portable electronic device 100 after power shutoff intensifies on roads other than main roads, as compared with the need on main roads.

In view of this, the non-increase area may be a main road, and the increase area may be a road other than a main road. With this configuration, even if the supply of the source power is shut off due to insufficient remaining battery capacity in a situation where the user becomes lost on a narrow road, the user is able to start up and use the portable electronic device 100.

Altitude

The storage 103 may store three-dimensional map information. The three-dimensional map information includes information on locations (e.g., latitude and longitude) in a horizontal plane, and information on the altitudes of the locations. This three-dimensional map information may be stored in advance in the storage 103, or may be acquired from an external device via the wireless communication unit 20.

Figure 16:
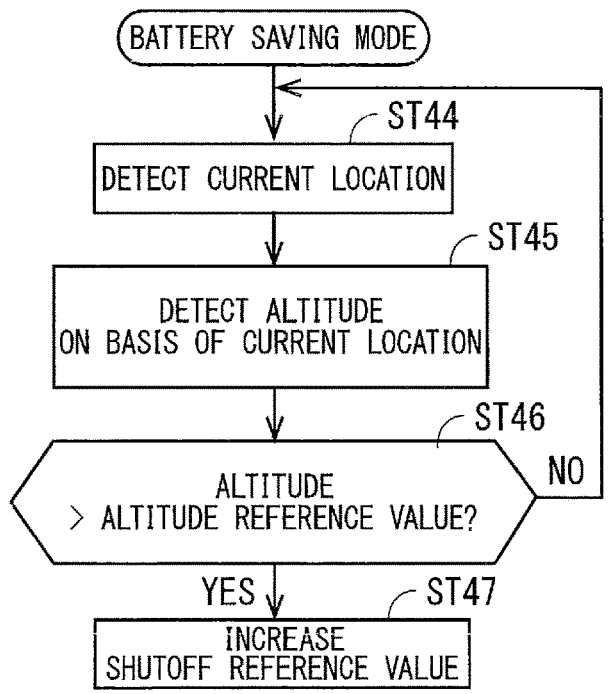
FIG. 16 illustrates a flowchart showing an example of the operation of increasing the shutoff reference value.

By using this three-dimensional map information and the current location acquired by the current location detector 82, the altitude of the current location can be obtained. The reference-value setting unit 130 may obtain altitude on the basis of the current location and the three-dimensional map information, and may increase the shutoff reference value in accordance with an increment of this altitude. FIG. 16 illustrates a flowchart showing an example of operations of the portable electronic device 100. In step ST44, the current location detector 82 detects the current location and outputs the detected current location to the reference-value setting unit 130. Next, in step ST45, the reference-value setting unit 130 obtains altitude on the basis of the current location and the map information stored in the storage 103. In step ST46, the reference-value setting unit 130 determines whether the obtained altitude is higher than an altitude reference value. When it is determined that the altitude is less than or equal to the altitude reference value, step ST44 is executed again. When it is determined that the altitude is higher than the altitude reference value, the reference-value setting unit 130 increases the shutoff reference value in step ST47.

Thus, even if the supply of the source power to the portable electronic device 100 is shut off due to insufficient remaining battery capacity in such a situation where the user has become lost on a mountain trail, the user is able to start up and use the portable electronic device 100.

Note that the shutoff reference value may be increased continuously or discretely as the altitude increases. This lengthens the operating time of the portable electronic device 100 in the case where it will take a long time to go down along a mountain trail.

The storage 103 may also store information on the altitude (living-area altitude) of the user's daily living area. This altitude information may, for example, be input to the input unit 50 by the user.

The reference-value setting unit 130 may use a sum of the living-area altitude and a predetermined value (e.g., 100 [m]) as the altitude reference value. In this case, the shutoff reference value can be increased when the difference in altitude between the current location of the user and the user's daily living area is greater than a predetermined value. That is, when the altitude is close to the living-area altitude, the user is highly likely to be in his or her daily living area, and therefore, the shutoff reference value is not increased.

Alternatively, the shutoff reference value may be increased when the altitude is higher than the altitude reference value over a predetermined period of time. This suppresses an increase in the shutoff reference value due to noise.

Also, a steeply inclined mountain trail increases the need for the portable electronic device 100 when the user becomes lost, because of great physical exhaustion. In view of this, the shutoff reference value may be increased when it is determined that the amount of change in altitude per unit of time is greater than a reference value. Also, the shutoff reference value may be increased continuously or discretely in accordance with an increase in the amount of change.

Third Embodiment

In a third embodiment, the shutoff reference value is increased on the basis of weather. For example, bad weather such as rain, wind, or snow provides poor visibility. Thus, when the user becomes lost in bad weather, he or she may not easily grasp his or her location. In view of this, the reference-value setting unit 130 increases the shutoff reference value when the weather is bad. The details will be described below.

Figure 17:
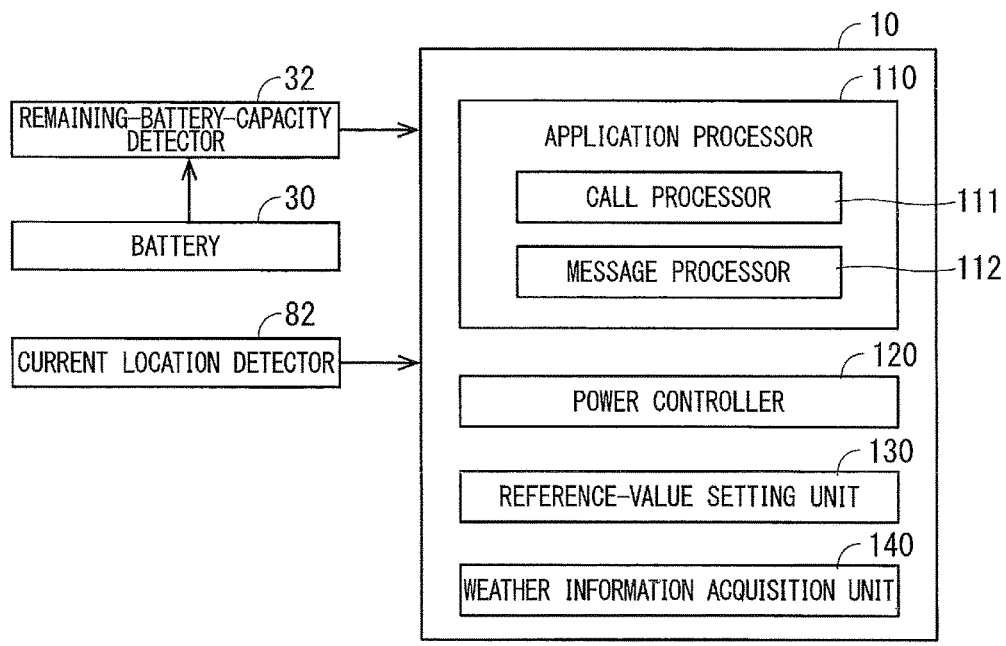
FIG. 17 schematically illustrates an exemplary internal configuration of the controller.

FIG. 17 schematically illustrates an exemplary internal configuration of the controller 10. As compared with FIG. 4, the controller 10 in FIG. 17 further includes a weather information acquisition unit 140. The weather information acquisition unit 140 can transmit a request signal for requesting weather information to an external device via the wireless communication unit 20. This external device stores weather information for a plurality of areas. The weather information includes, for example, rainfall per unit of time, snowfall per unit of time, wind velocity, fog density, and the presence or absence of lightning. In response to the request signal from the portable electronic device 100, the external device transmits the weather information for a plurality of areas to the portable electronic device 100.

The weather information acquisition unit 140 grasps weather information corresponding to the current location detected by the current location detector 82 on the basis of the current location. Note that the weather information acquisition unit 140 may transmit the current location along with the above request signal to the external device, and the external device may transmit the weather forecast corresponding to the received current location to the portable electronic device 100.

Figure 18:
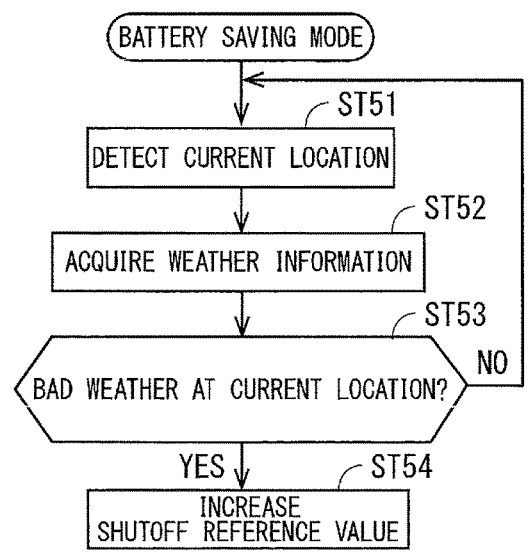
FIG. 18 illustrates a flowchart showing an example of the operation of increasing the shutoff reference value.

The reference-value setting unit 130 can increase the shutoff reference value when the weather at the current location is bad. FIG. 18 illustrates a flowchart showing an example of specific operations of the portable electronic device 100. In step ST51, the current location detector 82 detects the current location and outputs the detected current location to the reference-value setting unit 130. Next, in step ST52, the weather information acquisition unit 140 acquires weather information from the external device via the wireless communication unit 20 and outputs the acquired weather information to the reference-value setting unit 130. Then, in step ST53, the reference-value setting unit 130 determines whether the weather at the current location is bad. More specifically, the reference-value setting unit 130 determines, for example, whether the rainfall per unit of time, snowfall per unit of time, wind velocity, or fog density (hereinafter, also referred to as a "weather parameter") is greater than a predetermined reference value. To be more specific, if the weather parameter is higher than the reference value, it is determined that the weather is bad. When it is determined that the weather is not bad, step ST51 is executed again. When it is determined that the weather is bad, the reference-value setting unit 130 increases the shutoff reference value in step ST54.

With this configuration, even if the supply of the source power to the portable electronic device 100 is shut off due to insufficient remaining battery capacity in such a situation where the user has become lost in bad weather, the user is able to start up and use the portable electronic device 100. Thus, the user is able to appropriately cope with the situation by using the functions of the portable electronic device 100.

Also, the time required to find a proper route tends to be longer as visibility gets worse. Thus, the shutoff reference value may be increased continuously or discretely as the weather parameter increases.

Fourth Embodiment

In a fourth embodiment, the shutoff reference value is increased on the basis of the atmospheric pressure, current location, and weather information. FIG. 19 illustrates a flowchart showing an example of operations of the portable electronic device 100. For example, in step ST61, the current location detector 82 detects the current location. Next, in step ST62, the reference-value setting unit 130 performs processing for increasing the shutoff reference value on the basis of the current location. For example, when the current location belongs to an increase area (e.g., an area other than an urban area, or a road other than a main road), the shutoff reference value is increased by a locational increase amount, as described in the second embodiment. The locational increase amount may be set in advance and stored in, for example, the storage 103.

Next, in step ST63, the pressure detector 80 detects atmospheric pressure. Then, in step ST64, the reference-value setting unit 130 performs processing for increasing the shutoff reference value on the basis of atmospheric pressure. For example, when the atmospheric pressure is lower than the atmospheric-pressure reference value, the shutoff reference value is increased by a pressure increase amount, as described in the first embodiment. The pressure increase amount may be set in advance, or may be set to increase as the atmospheric pressure decreases.

Next, in step ST65, the weather information acquisition unit 140 acquires weather information from an external device via the wireless communication unit 20. Then, in step ST66, the reference-value setting unit 130 performs processing for increasing the shutoff reference value on the basis of the weather at the current location. For example, when the weather parameter is greater than the reference value, the shutoff reference value is increased by a weather increase amount, as described in the third embodiment. The weather increase amount may be set in advance, or may be set to increase as the weather parameter increases.

The locational increase amount, the pressure increase amount, and the weather increase amount may be appropriately set, and may be set to different values.

While the above has been a detailed description of portable electronic devices, the above description is illustrative in all aspects, and portable electronic devices of the present disclosure are not limited to the description given above. Numerous modifications and variations that are not illustrated are conceivable without departing from the scope of portable electronic devices of the present disclosure.

Embodiments of the present disclosure may be implemented in combination as long as there are no mutual inconsistencies.

The invention claimed is:

1. A portable electronic device comprising:
   a battery configured to supply power;
   a transceiver including an antenna, wherein the transceiver is configured to communicate with an external device;
   a pressure detector configured to detect pressure; and
   at least one processor configured to increase a shutoff reference value in accordance with a drop in the pressure, and when a remaining battery capacity of the battery is less than the shutoff reference value, to shut off the supply of the power.

2. The portable electronic device according to claim 1, wherein
   the at least one processor increases the shutoff reference value when the pressure is less than a pressure reference value for a predetermined period of time.

3. The portable electronic device according to claim 1, wherein
   the at least one processor increases the shutoff reference value when an amount of change in the pressure is greater than a change reference value.

4. The portable electronic device according to claim 1, wherein
   when an amount of change in the pressure is greater than a determination value, the at least one processor increases the shutoff reference value by adding to the shutoff reference value, a first increment that is based on the determination value and a second increment that depends on a difference between the amount of change and the determination value.

5. The portable electronic device according to claim 4, wherein
the determination value includes a statistic of the amount of change in the pressure.

6. The portable electronic device according to claim 1, further comprising:
a location detector configured to detect a location of the portable electronic device,
wherein the at least one processor increases the shutoff reference value when the location belongs to a predetermined area.

7. The portable electronic device according to claim 1, further comprising:
a location detector configured to detect a location of the portable electronic device,
wherein the at least one processor acquires weather information and increases the shutoff reference value when weather at the location is bad.

8. The portable electronic device according to claim 1, further comprising:
a non-volatile storage; and
a location detector configured to detect a location of the portable electronic device,
wherein the at least one processor stores the location in the non-volatile storage before shutting off the supply of the power.

9. The portable electronic device according to claim 1, further comprising:
a storage configured to store three-dimensional map information; and
a location detector configured to detect a location of the portable electronic device,
wherein the at least one processor obtains an altitude of the location on the basis of the location and the map information, and increases the shutoff reference value in accordance with an increase in the altitude.

10. The portable electronic device according to claim 1, further comprising:
an input unit configured to receive input of a power-on instruction and a power shutoff instruction,
wherein the at least one processor executes a plurality of applications that include a communication application for communicating with an external device via the transceiver, and
the at least one processor disables at least one of the applications, excluding the communication application, when the power-on instruction is input in a state in which supply of the power is shut off on the basis of the increased shutoff reference value.

11. The portable electronic device according to claim 10, wherein
the at least one processor disables at least one of the applications, excluding the communication application, when the remaining battery capacity at the time of input of the power-on instruction is higher than a first power reference value and less than a second power reference value, the first power reference value being higher than or equal to an initial value of the shutoff reference value, and the second power reference value being higher than the first power reference value.

12. The portable electronic device according to claim 1, further comprising;
a location detector configured to detect a location of the portable electronic device; and
an input unit,
wherein the at least one processor performs log processing for storing, as log information, the location that is repeatedly detected, in response to input to the input unit, and
the at least one processor increases the shutoff reference value in accordance with a drop in the pressure when performing the log processing.

13. A method of controlling a portable electronic device, comprising:
detecting pressure;
increasing a shutoff reference value in accordance with a drop in the pressure; and
shutting off power supply from a battery of the portable electronic device when a remaining battery capacity of the battery is less than the shutoff reference value.

14. A non-transitory computer readable recording medium that stores a control program for controlling a portable electronic device, the control program causing the portable electronic device to execute the steps of:
detecting pressure;
increasing a shutoff reference value in accordance with a drop in the pressure; and
shutting off power supply from a battery of the portable electronic device when a remaining battery capacity of the battery is less than the shutoff reference value.

* * * * *